(12) United States Patent
Kitajima et al.

(10) Patent No.: US 6,460,858 B1
(45) Date of Patent: Oct. 8, 2002

(54) MECHANICAL SEAL

(75) Inventors: Munenari Kitajima; Masayuki Toyoshima; Hiroshi Oka, all of Tokyo (JP)

(73) Assignee: Tanken Seal Seiko Co., Ltd., Tokyo (JP)

( * ) Notice: Subject to any disclaimer, the term of this patent is extended or adjusted under 35 U.S.C. 154(b) by 0 days.

(21) Appl. No.: 09/630,048

(22) Filed: Aug. 1, 2000

(30) Foreign Application Priority Data

Mar. 15, 2000 (JP) ........................................ 2000-071543

(51) Int. Cl.$^7$ ................................................. F16J 15/34
(52) U.S. Cl. ........................ 277/370; 277/372; 277/373; 277/390; 277/358
(58) Field of Search ................................. 277/350, 370, 277/371, 372, 373, 379, 390

(56) References Cited

U.S. PATENT DOCUMENTS

| | | | | |
|---|---|---|---|---|
| 3,026,114 A | * | 3/1962 | Anderson et al. | 277/372 |
| 3,410,566 A | * | 11/1968 | Wiese et al. | 277/372 |
| 6,003,875 A | * | 12/1999 | Ellis et al. | 277/372 |

* cited by examiner

*Primary Examiner*—Anthony Knight
*Assistant Examiner*—Enoch Peavey
(74) *Attorney, Agent, or Firm*—Nields & Lemack

(57) ABSTRACT

The compression ring 21 is mounted on the seal ring 20 at the end thereof. The compression ring 21 has the outer circumference projections 30 that are fixed in the groove 40 extending in the axial direction at the inner surface of the flange 22 . With this construction, the compression ring 21 can move in the axial direction and is stopped in the rotational direction. The compression ring 21 is pressed by the springs 23. Thus the compression ring 21 works as a stopper to stop the rotation of the seal ring 20 and as a spring receiver.

2 Claims, 3 Drawing Sheets

PRIOR ART

MECHANICAL SEAL

BACKGROUND OF THE INVENTION AND RELATED ART STATEMENT

This invention relates to a mechanical seal.

The mechanical seal, which accomplishes sealing by slidably contacting the end faces of a rotary ring and a non-rotary ring, is widely used as seal equipment in various fields.

The rotary ring rotates in association with rotation of a rotary shaft on which the ring is mounted, and the non-rotary ring does not rotate because it is fixed in the casing side. However, since the non-rotary ring is in contacting condition with the rotary ring and receives turning force by friction resistance, a stop for preventing the rotation of the non-rotary ring is necessary.

Further, it is required that at least one ring of said rotary and non-rotary rings must be slidable in the axial direction of the shaft and it must be pressed by a spring in the direction toward the slide end faces in order to cope with abrasion of the slide end faces and vibrations and to keep the contact pressure of the slide end faces. The mechanical seal where the non-rotary ring is slidable is called a static mechanical seal.

The conventional mechanical seal as shown in FIG. 3 adopts the composition where a compression ring 50 is set on the end of a non-rotary ring 61, a stop pin 51 is equipped on the compression ring 50 and the non-rotary ring 61 is pressed by spring 52 toward a rotary ring 60. However, in case of the conventional composition, the stop pin 51 makes the unit size long in the axial direction and it is impossible to install the unit in spaces having a limited dimension.

Further, it is difficult to assemble the unit, and a middle flange 54 is necessary in addition to a flange 53, which increases the cost.

The present invention solves the problems of the prior art described above.

SUMMARY OF THE INVENTION

The mechanical seal of this invention comprises a rotary ring mounted on a rotary shaft and rotates in association with the rotary shaft, a non-rotary ring mounted in a casing slidably contacting with the rotary ring to form sealing faces, a compression ring stopped at least in a rotating direction at an outer circumference thereof by the casing for fixing the non-rotary ring in the rotating direction and for contacting with said non-rotary ring so as to transfer pressure force toward said rotary ring, and a spring contacted with said compression ring for biasing said non-rotary ring toward said rotary ring via said compression ring.

The mechanical seal of this invention does not need a stop for preventing the rotation of the compression ring because the compression ring itself is caught by the casing at the outer circumference and the movement in the rotating direction is prevented. Consequently, the mechanical seal unit can be shortened in the axial direction and can be easily assembled.

In the preferred embodiment, the compression ring stops said non-rotary ring in the rotary direction. The compression ring has a projection projecting in a radial direction at the outer circumference thereof and there is a flange having a groove that accepts said projection to stop the rotation and to allow an axial movement of said compression ring. A spring contacts at one end with said compression ring and at other end with said flange for pressing said non-rotary ring to said rotary ring via said compression ring. Such compression ring functions to prevent the rotation of the non-rotary ring and receives the pressure of the spring.

The invention is more advantageous when it is reduced to practice as a cartridge type of mechanical seal. In the cartridge type of mechanical seal, a wide usefulness is very important. The mechanical seal of the invention can decrease the length in the axial direction and can be installed in limited spaces. In such type of mechanical seal it is preferred that said flange has an opening the diameter of which is bigger than said compression ring, and in the opening a retainer ring for holding said non-rotary ring is mounted. With such construction, the flange may be one piece instead of two pieces as in the prior art.

In the preferable embodiment, the opening is in succession with said groove and said compression ring is inserted through the opening to the groove so as to put the projection into the groove. A retainer ring for holding said non-rotary ring is installed in said opening after said compression ring is mounted.

DETAILED DESCRIPTION OF PREFERRED EMBODIMENT

The invention will now be described in reference to the attached drawings.

Figure 1:
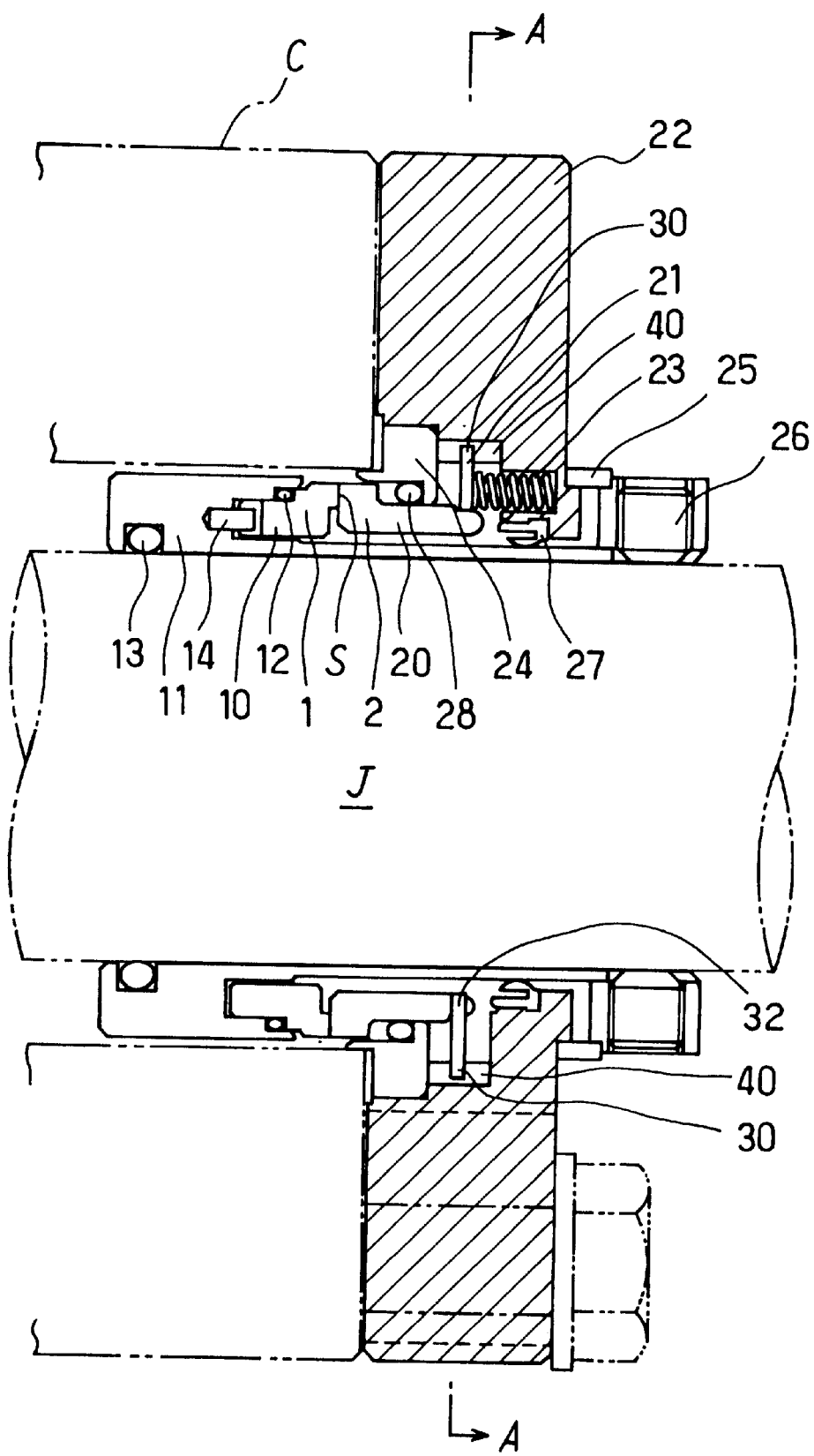
FIG. 1 is a front sectional view showing an embodiment of the invention.

FIG. 1 shows the mechanical seal of this invention being fixed on a rotary shaft J. C is a casing of equipment having the rotary shaft J.

The mechanical seal includes a rotary ring unit 1 and a stationary ring unit 2.

The rotary ring unit 1 comprises a sleeve 11 mounted on the shaft J and a rotary ring 10 inserted on the sleeve 11 with an O-ring 12. 14 indicates a pin.

The stationary ring unit 2 includes a seal ring 20 that has an end face sliding with the end face of the rotary ring 10 to form sealing faces S and a retainer ring 24 receiving the seal ring 20 with an O ring 28. The seal ring 20 is movable in the axial direction with respect to the retainer ring 24 so that it can compensate for the axial movement of the shaft J and wear of the sealing faces S. The retainer ring 24 is inserted in and supported by a flange 22.

Figure 2:
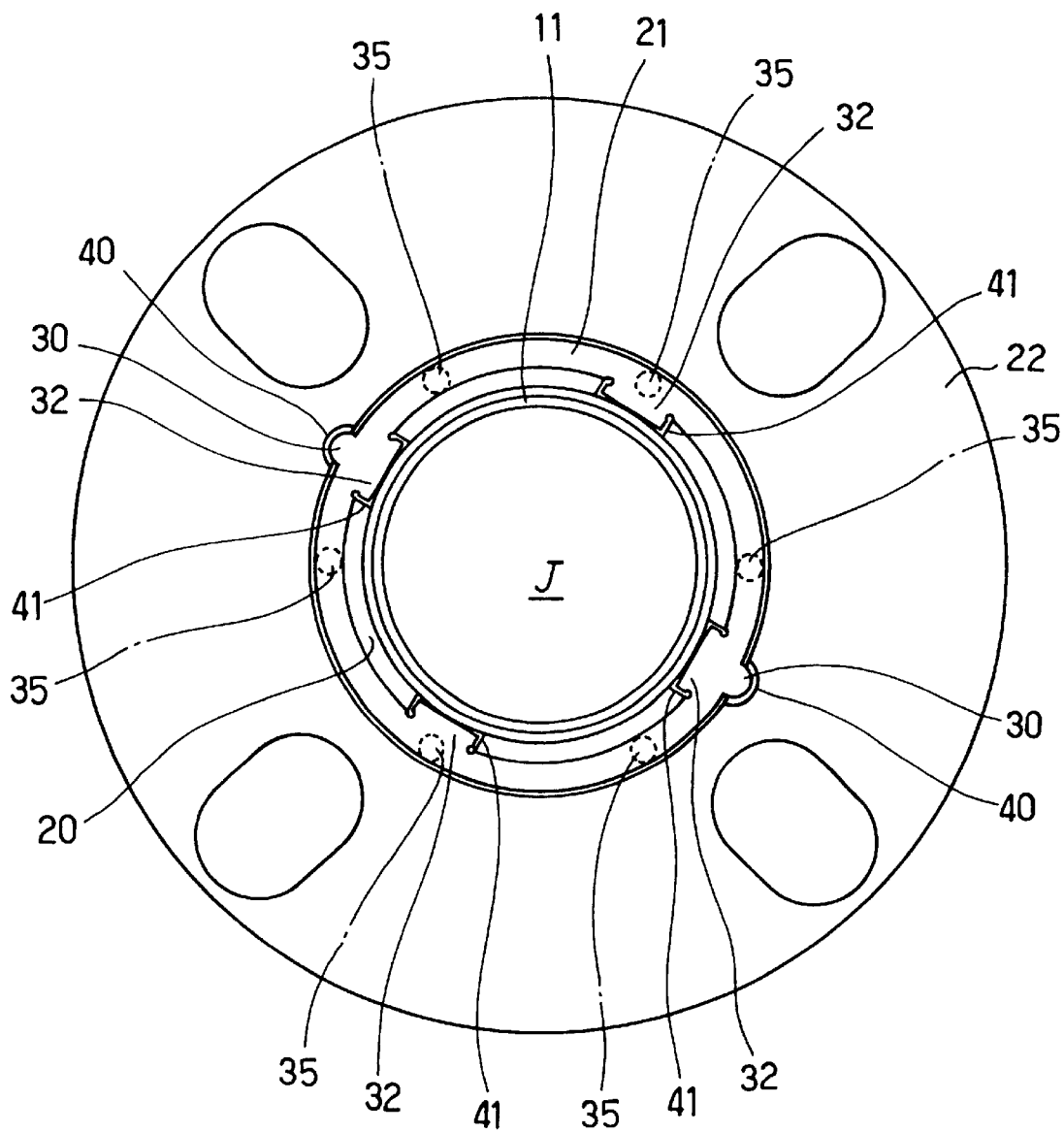
FIG. 2 is a sectional view along A—A of FIG. 1.
Figure 3:
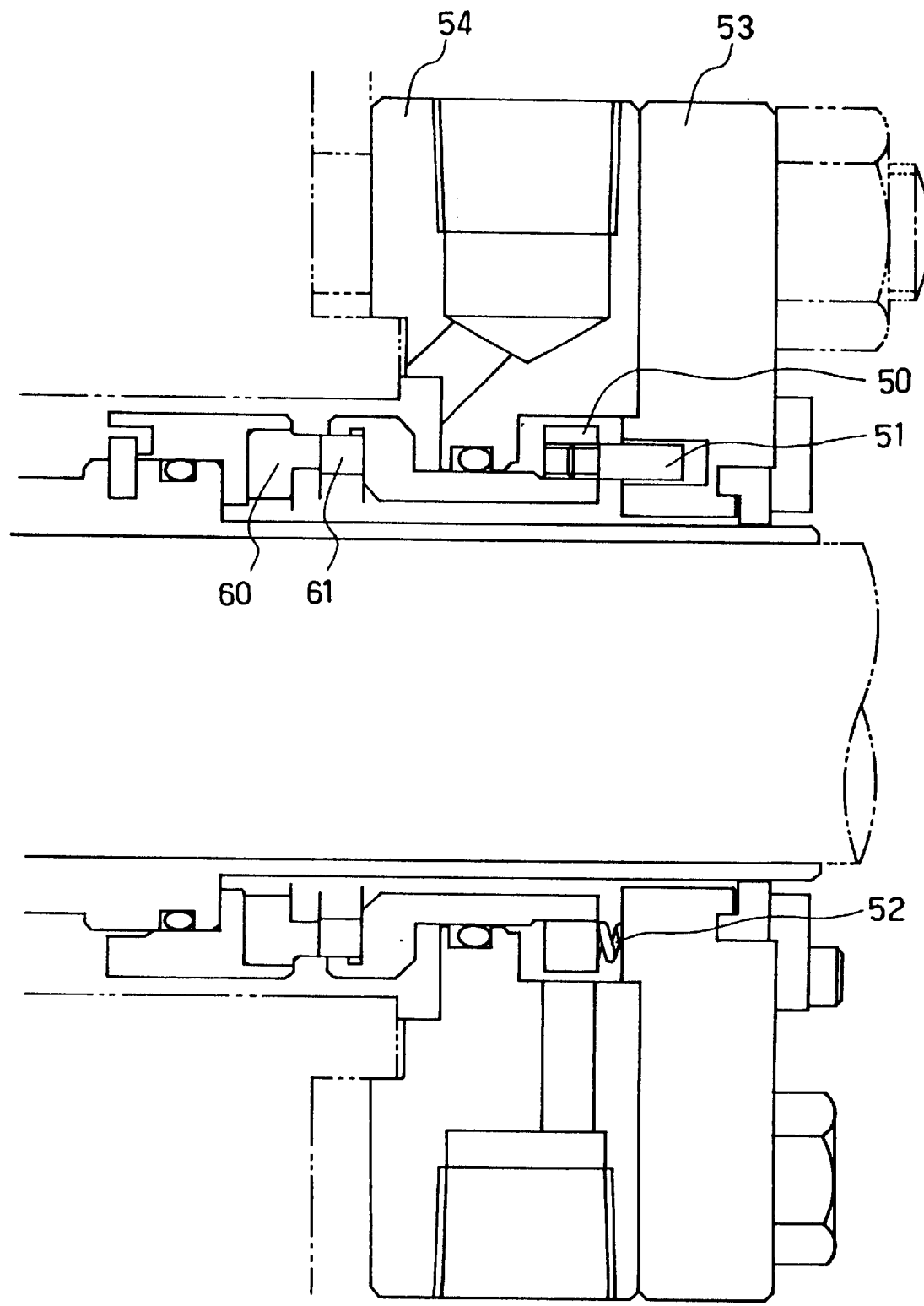
FIG. 3 is a front sectional view that explains the structure of conventional mechanical seal.

A compression ring 21 is mounted on the seal ring 20. As shown in FIG. 2, the compression ring 21 includes two outer circumference projections 30 projecting at the outer circumference and inner circumference projections 32 projecting at the inner circumference. The seal ring 20 is formed with fitting grooves 41 corresponding to the inner circumference projections 32. The inner circumference projections 32 are stopped both in the rotational direction and in the axial direction by being fitted into the fitting grooves 41. Though the outer circumference projections 30 of the embodiment are in a shape of a half circle and the number is two in the embodiment, the shape and number are optional. The shape of the inner circumference projections 32 is square and the number is four, the shape and number are arbitrary as well.

Grooves 40 are formed in the inner side of the flange 22 at the corresponding positions to the outer circumference projections 30 of the compression ring 21. The grooves 40 have a certain length in the axial direction as shown in FIG. 1. The outer circumference projections 30 are fixed in the groove 40 and stopped in the rotational direction but are allowed to move in the axial direction to the extent of the length of the groove 40. Consequently, the compression ring 21 can move in association with the movement of the seal ring 20 in the axial direction but is stopped in the rotational direction.

The flange 22 is provided with springs 23 arranged in the peripheral direction, the tops of the springs 23 abut to the spring receiving portions 35 of the compression ring 21. The pressures of the springs 23 are transferred to the seal ring 20 through the compression ring 21 so as to press the seal ring 20 toward the rotary ring 10.

At the casing C of the flange 22, is formed an open aperture having a bigger diameter than the groove 40, that is than the compression ring 21. Said retainer ring 24 is mounted on the aperture. When assembling, the springs 23 and the compression ring 21 are inserted through said aperture and then the retainer ring 24 follows. With this structure, the stop pin to stop the rotational movement of the compression ring 21 is not necessary because the compression ring 21 is stopped in the rotational direction by the outer circumference projections 30 fitting in the groove 40. Accordingly, one piece of the flange 22 is sufficient and the length in the axial direction of the flange 22 can be shortened.

Said flange 22 is secured to the casing C by a bolt or the like. The axial center of the flange 22 is adjusted based on a set screw 26 via a preset ring 25 which will be taken off after installing the flange 22. 27 indicates a bush.

In the construction explained above, the compression ring 21 is stopped by the outer circumference projections 30 in the rotational direction and also it stops the rotation of the seal ring 20 by the inner circumference projections 32. The compression ring 21 further receives the pressure of the springs 23 at the spring receiving portions 35 to transfer the pressure to the seal ring 20. Therefore the conventional stop pin is not needed, which make the axial length long. Further, the conventional intermediate flange or the like is not necessary. Accordingly the mechanical seal of the invention is simple in structure, easy in assembling and short in the axial direction.

What is claimed is:

1. A mechanical seal comprising:

a rotary ring mounted on a rotary shaft, said rotary ring being rotatable with the rotary shaft, a non-rotary ring mounted in a casing slidably contacting with the rotary ring to form sealing faces, a compression ring having a projection projecting in a radial direction at the outer circumference thereof for fixing the non-rotary ring in the rotating direction and for contacting with said non-rotary ring so as to transfer pressure force toward said rotary ring, a flange having a groove that accepts said projection to stop rotation and to allow an axial movement of said compression ring, said flange having an opening the diameter of which is greater than said compression ring, and a spring contacted at one end with said compression ring and at the other end with said flange for biasing said non-rotary ring toward said rotary ring via said compression ring, and a retainer ring for holding said non-rotary ring installed in said opening.

2. A mechanical seal comprising:

a rotary ring mounted on a rotary shaft, said rotary ring being rotatable with the rotary shaft, a non-rotary ring mounted in a casing slidably contacting with the rotary ring to form sealing faces, a compression ring having a projection projecting in a radial direction at the outer circumference thereof for fixing the non-rotary ring in the rotating direction and for contacting with said non-rotary ring so as to transfer pressure force toward said rotary ring, a flange having a groove that accepts said projection to stop rotation and to allow an axial movement of said compression ring, said flange having an opening the diameter of which is greater than said compression ring, said opening being in succession with said groove, and a spring contacted at one end with said compression ring and at other end with said flange for biasing said non-rotary ring toward said rotary ring via said compression ring, said compression ring being inserted through said opening and said projection is placed in said groove, and wherein said mechanical seal further comprises a retainer ring for holding said non-rotary ring installed in said opening after said compression ring is mounted.

\* \* \* \* \*